United States Patent [19]

Cloutier et al.

[11] Patent Number: 5,384,613
[45] Date of Patent: Jan. 24, 1995

[54] SINGLE-USE CAMERA WITH WEAKENED AREA TO ACCESS FILM CASSETTE

[75] Inventors: Robert P. Cloutier, Spencerport; Gerald J. Angeli, Fairport, both of N.Y.

[73] Assignee: Eastman Kodak Company, Rochester, N.Y.

[21] Appl. No.: 182,905

[22] Filed: Jan. 14, 1994

[51] Int. Cl.⁶ ............................................. G03B 17/26
[52] U.S. Cl. ..................................... 354/275; 354/288
[58] Field of Search ................. 354/75, 203, 275, 277, 354/288

[56] References Cited

U.S. PATENT DOCUMENTS

| | | | |
|---|---|---|---|
| Re. 34,168 | 1/1993 | Ohmura et al. | 354/145.1 |
| 4,801,957 | 1/1989 | Vandemoere | 354/147 |
| 4,855,774 | 8/1989 | Ohmura et al. | 354/203 |
| 4,890,130 | 12/1989 | Takei et al. | 354/288 |
| 4,903,058 | 2/1990 | Schappler | 354/145.1 |
| 4,954,857 | 9/1990 | Mochida et al. | 354/75 |
| 4,954,858 | 9/1990 | Ohmura et al. | 354/145.1 |
| 4,972,649 | 11/1990 | Mochida et al. | 53/430 |
| 4,973,998 | 11/1990 | Gates | 354/145.1 |
| 5,003,330 | 3/1991 | Kotani et al. | 354/145 |
| 5,063,400 | 11/1991 | Takei et al. | 354/288 |
| 5,146,255 | 9/1992 | Nakai et al. | 354/288 |
| 5,148,198 | 9/1992 | Shiba | 354/319 |
| 5,268,713 | 12/1993 | Kataoka | 354/288 |
| 5,296,887 | 3/1994 | Zander | 354/275 |

*Primary Examiner*—Howard B. Blankenship
*Attorney, Agent, or Firm*—Roger A. Fields

[57] ABSTRACT

A single-use camera comprises a light-tight film casing and a film cassette located inside the casing. The film cassette includes a rotatable film spool with an end portion engageable to rotate the spool, and an active light lock with an end portion engageable to rotate the light lock open to permit film movement out of and into the cassette interior and closed to prevent ambient light from entering the cassette interior. The casing has separate weakened areas covering the end portion of the spool and the end portion of the light lock which can be entirely pierced to make respective perforations in the casing to permit individual access to the end portions to engage them for rotating the spool and for rotating the light lock closed and, simultaneously, to destroy the casing to prevent it from being reused.

5 Claims, 6 Drawing Sheets

SINGLE-USE CAMERA WITH WEAKENED AREA TO ACCESS FILM CASSETTE

CROSS-REFERENCE TO RELATED APPLICATIONS

Reference is made to commonly assigned copending applications Ser. No. 08/066686 entitled FILM CASSETTE WITH FILM EXPOSURE-STATUS INDICATOR MEANS and filed May 20, 1993 in the name of Dennis R. Zander, and Ser. No. 08/181,286 entitled FILM CASSETTE WITH LOCKABLE LIGHT SHIELD and filed, Jan. 13, 1994 in the names of Dennis R. Zander and Douglas M. Csaszar. Each of these cross-referenced applications is incorporated in this application.

FIELD OF THE INVENTION

The invention relates generally to the field of photography, and in particular to single-use cameras.

BACKGROUND OF THE INVENTION

Single-use cameras have recently become well known, for example, the "Kodak FunSaver 35 with FLASH". Typically, the single-use camera is a simple point-and-shoot type which comprises a plastic light-tight film casing or housing with a fixed-focus taking lens, a film metering mechanism, a single blade shutter, a frame (exposure) counter, and possibly a built-in electronic flash unit, and a decorative cardboard cover containing the light-tight casing and having respective openings for the taking lens, a shutter release button, a film advance thumbwheel, a direct see-through viewfinder, the frame counter, and a flash emission window. At the manufacturer, the light-tight casing is loaded with a conventional 12, 24, or 36 exposure 35 mm film cassette and substantially the entire length of the unexposed filmstrip is factory prewound from the cassette onto a spool in the casing or simply into a roll. Then, after the photographer takes a picture, he or she manually rotates the thumbwheel to rewind the exposed frame into the cassette. The rewinding movement of the filmstrip the equivalent of slightly more than one frame rotates a metering sprocket to decrement the frame counter to its next lower numbered setting. Further details of this operation are disclosed in commonly assigned U.S. Pat. No. 5,235,366, issued Aug. 10, 1993, and in U.S. Pat. No. 4,890,130, issued Dec. 26, 1989. When the maximum number of exposures available on the filmstrip are exposed and the filmstrip is completely rewound into the cassette, the camera is given to a photofinisher who first removes the cassette with the filmstrip from the casing to develop the negatives and then forwards the camera to the manufacturer for recycling. The manufacturer, in turn, recycles the camera by loading it with another roll of film and repeating the foregoing prewinding process.

PROBLEM TO BE SOLVED BY THE INVENTION

There is a need recognized, as expressed in U.S. Pat. No. 4,890,130, to prevent unauthorized recycling of single-use cameras.

SUMMARY OF THE INVENTION

According to one aspect of the invention, a single-use camera comprising a light-tight film casing and a film cassette located inside the casing, is characterized in that:

the film cassette has an active light lock with an end portion engageable to rotate the light lock open to permit film movement out of and into the cassette interior and closed to prevent ambient light from entering the cassette interior the casing has a weakened area covering the end portion of the light lock which can be entirely pierced to make a perforation in the casing to permit access to the end portion to engage it for rotating the light lock closed and, simultaneously, to destroy the casing to prevent it from being reused.

According to another aspect of the invention, the film cassette has a rotatable film spool with an end portion engageable to rotate the spool and the casing has a weakened area covering the end portion of the spool which can be entirely pierced to make a perforation in the casing to permit access to the end portion to engage it for rotating the spool and, simultaneously, to destroy the casing to prevent it from being reused.

ADVANTAGEOUS EFFECT OF THE INVENTION

The invention provides a way to prevent unauthorized recycling of a single-use camera.

DETAILED DESCRIPTION OF THE INVENTION

The invention is disclosed as being embodied preferably in a single-use camera. Because the features of a single-use camera are generally known as exemplified by U.S. Pat. No. 4,890,130, the description which follows is directed in particular only to those elements forming part of or cooperating directly with the disclosed embodiment. It is to be understood, however, that other elements may take various forms known to a person of ordinary skill in the art.

The Film Cassette—General

Figure 2:
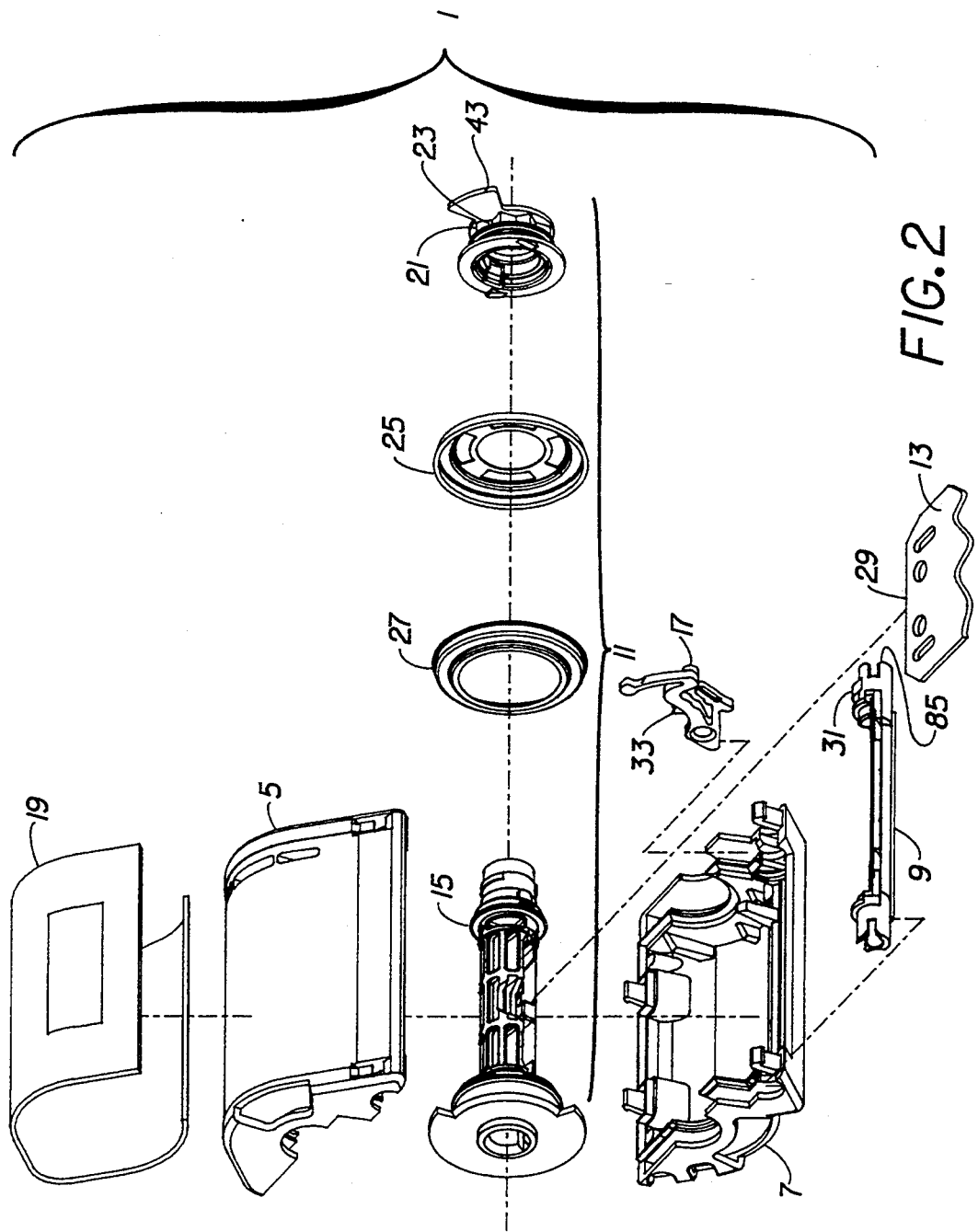
FIG. 2 is an exploded perspective view of the film cassette.
Figure 4:
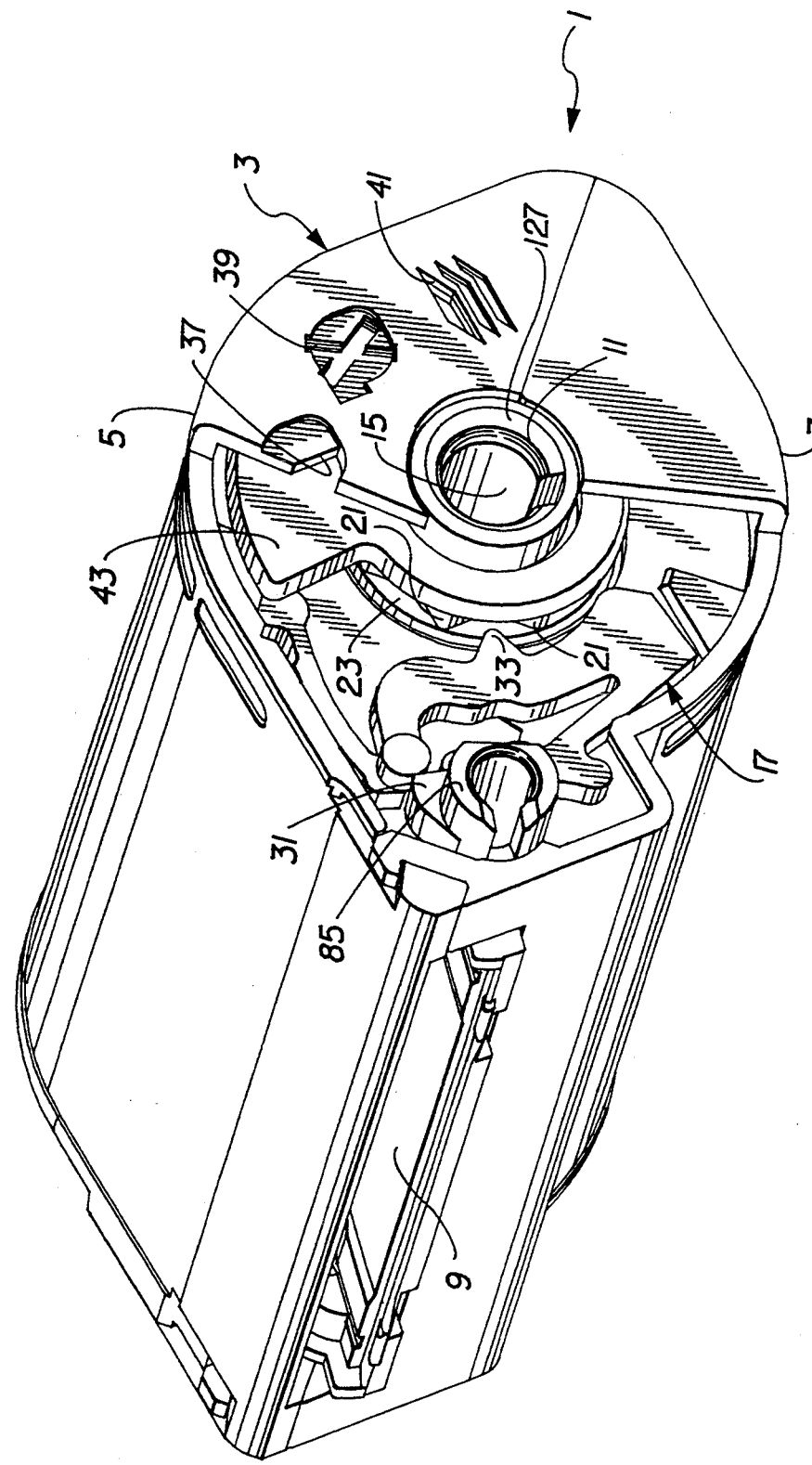
FIG. 4 is an assembled perspective view of the film cassette depicted with part of the cassette shell cut away to show a spool lock.

Referring now to the drawings, FIG. 2 is an exploded perspective view of a film cassette 1 in accordance with a preferred embodiment of the invention, and FIG. 4 is an assembled perspective view of the film cassette depicted partly cut away to show certain details of its interior. Generally, the film cassette 1 comprises a cassette shell 3 made up of two mating shell halves 5 and 7, an active light lock 9 rotated closed to prevent ambient light from entering the cassette interior through a film egress/ingress slot located between the two shell halves and rotated open to permit film movement into and out of the cassette interior via the film egress/ingress slot, a film spool 11 rotatable inside the cassette shell in opposite film unwinding and film winding directions to unwind a filmstrip 13 off the spool core 15 and to wind the filmstrip onto the spool core as in commonly assigned U.S. Pat. No. 5,234,174, issued Aug. 10, 1993, a spool lock 17 for engaging the spool core to prevent rotation of the film spool and movable out of engagement to release the film spool, and a cassette covering label 19.

Figure 5:
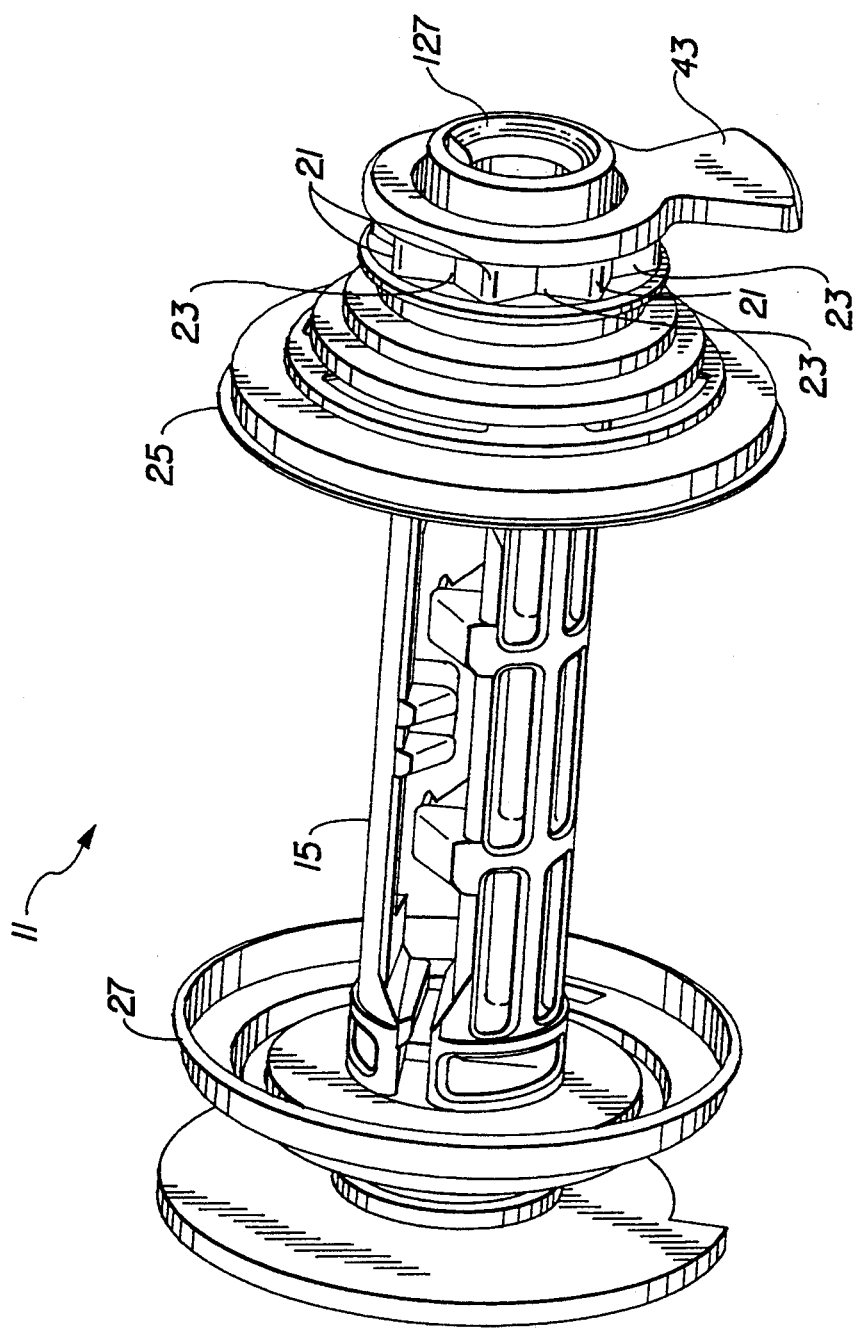
FIG. 5 is a perspective view of a film spool which is rotatably supported inside the cassette shell.

The spool core 15 as shown in FIGS. 2, 4, and 5 has a toothed periphery consisting of successive symmetrical teeth 21 separated by interdental spaces 23, and it supports a pair of coaxial flanged disks 25 and 27 between which the filmstrip 13 is stored in roll form. A trailing or inner end 29 of the filmstrip 13 is attached to the spool core 15.

The active light lock 9 as shown in FIGS. 2 and 4 includes integral cam means 31 for pivoting the spool lock 17 to a locking position as the active light lock is closed. When the spool lock 17 is in its locking position, not shown, an integral detent 33 of the spool lock is located in anyone of the interdental spaces 23 between two adjacent teeth 21 of the spool core 15 to secure the film spool 11 in any one of a number of rotational orientations equal to the number of interdental spaces. If the active light lock 9 is opened as shown in FIG. 4, its cam means 31 is retracted from the spool lock 17. As a result, forcible rotation of the film spool 11 in the film winding or film unwinding direction will cause one of the two adjacent teeth 21 between which the detent 33 is located to eject the detent from the interdental space 23 separating those two teeth. Thus, the spool lock 17 will be pivoted out of its locking position.

THE FILM EXPOSURE-STATUS INDICATING MEANS OF THE FILM CASSETTE

Figure 3:
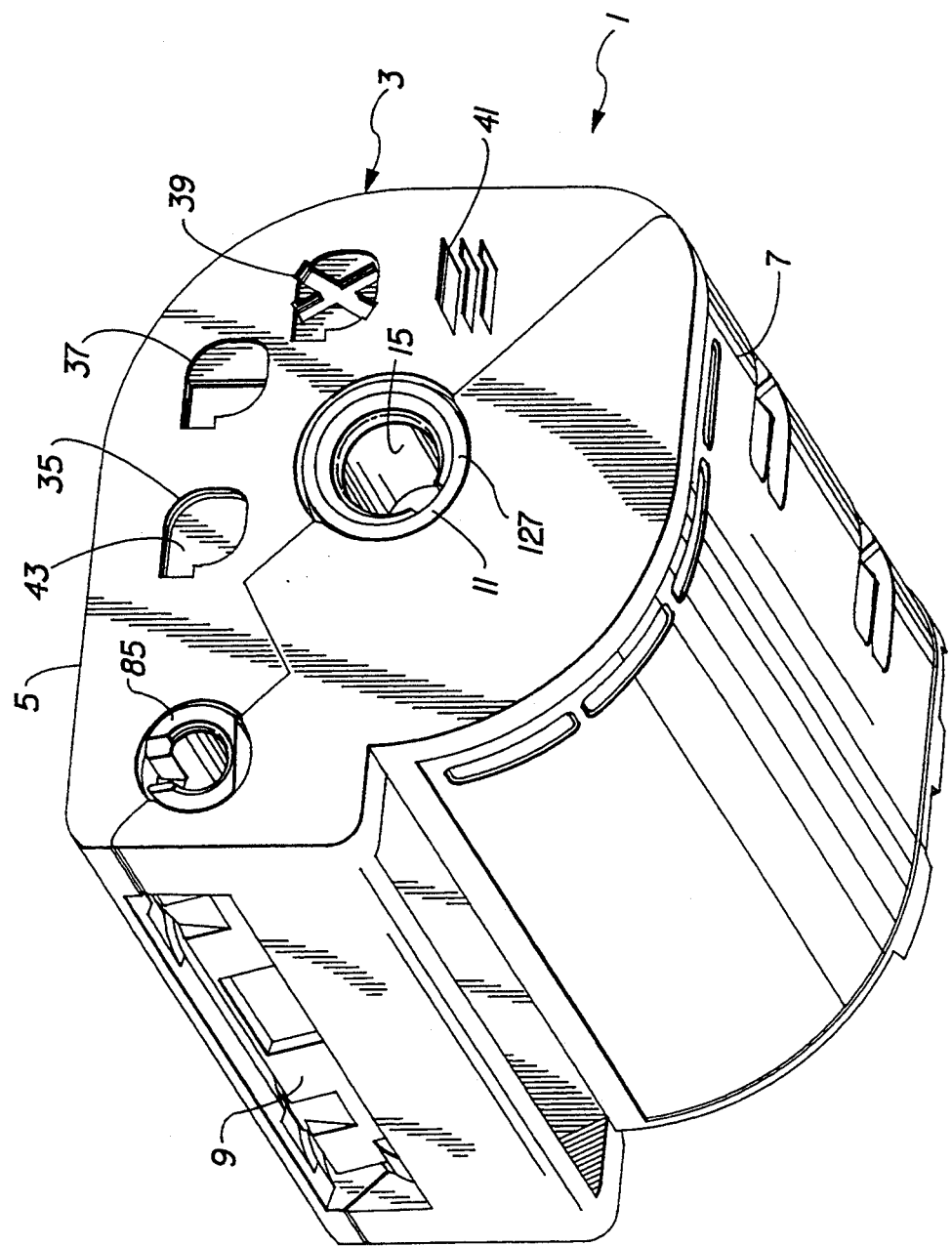
FIG. 3 is an assembled perspective view of the film cassette.

The shell half 5 at one of its ends has four different icons in the form of respective cut-outs 35, 37, 39, and 41 shown in FIG. 3. The icon cut-out 35 is uniquely shaped to effect an indication that the filmstrip 13 is fresh or unexposed. The icon cut-out 37 is uniquely shaped to effect an indication that the filmstrip 13 is partly exposed (and partly unexposed). The icon cut-out 39 is uniquely shaped to effect an indication that the filmstrip 13 is fully exposed. The icon cut-out 41 is uniquely shaped to effect an indication that the filmstrip 13 has been processed in a film processing machine to develop the latent images on the exposed film.

An indicator flag 43, which preferably is a different color than the cassette shell 3, is coaxially fixed to the spool core 15 as shown in FIGS. 2 and 5, to be rotated with the film spool 11 in the film unwinding and film winding directions. Initially, the flag 43 is secured with the film spool 11 in a rotational orientation that locates the flag immediately beneath the cut-out 35 as shown in FIG. 3, to be visible to provide an indication that the filmstrip 13 is fresh or unexposed. Conversely, when the flag 43 is secured with the film spool 11 in a rotational orientation that locates the flag immediately beneath the cut-out 37, it is visible to provide an indication that the filmstrip 13 is partly exposed (and partly unexposed). When the flag 43 is secured with the film spool 11 in a rotational orientation that locates the flag immediately beneath the cut-out 39, it is visible to provide an indication that the filmstrip 13 is fully exposed. When the flag 43 is secured with the film spool 11 in a rotational orientation that locates the flag immediately beneath the cut-out 41, it is visible to provide an indication that the filmstrip 13 has been processed to develop latent images on the filmstrip.

THE SINGLE-USE CAMERA—PREFERRED EMBODIMENT

Figure 1:
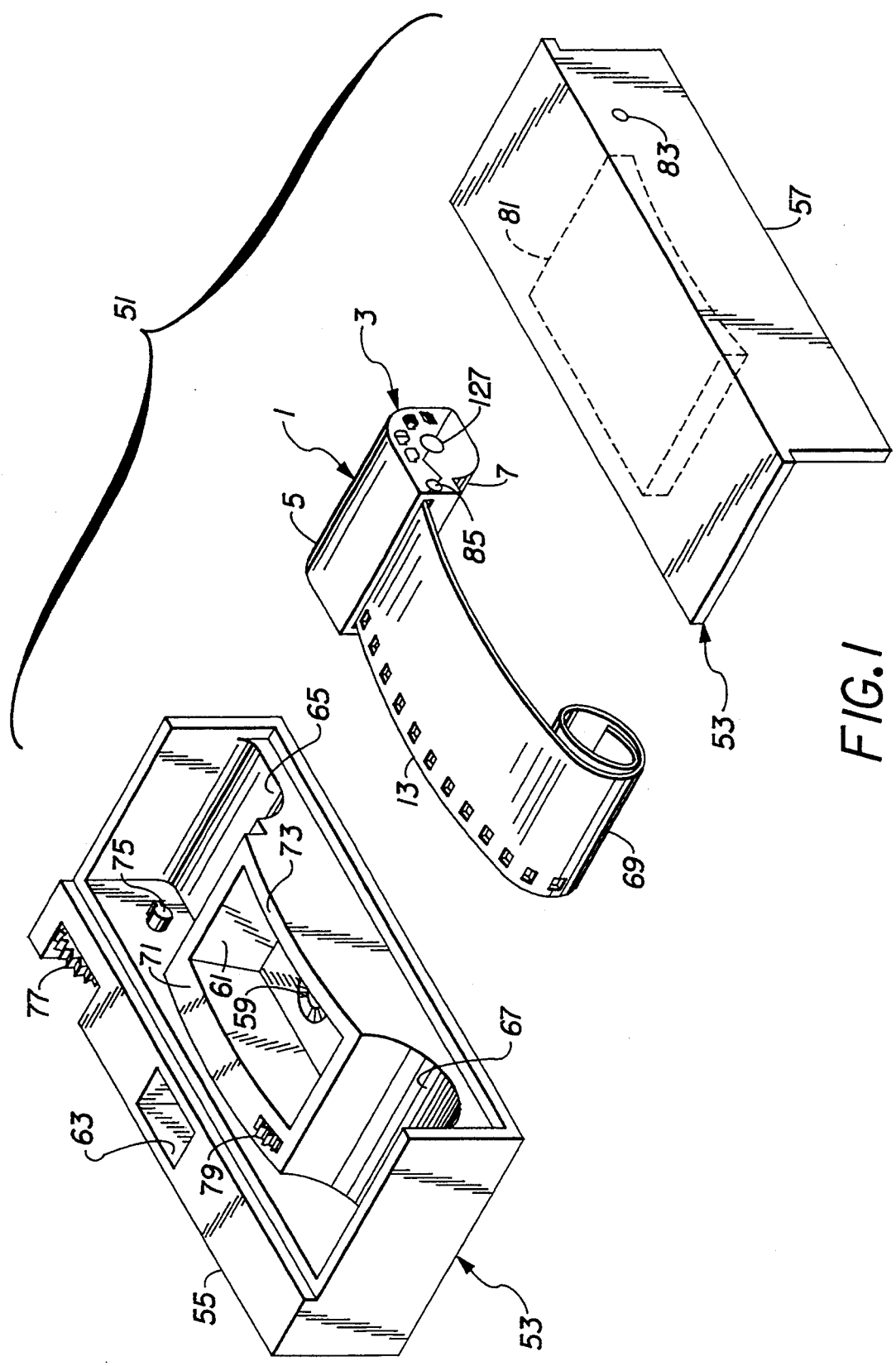
FIG. 1 is a rear exploded perspective view of a single-use camera in accordance with a preferred embodiment of the invention, showing front and rear sections of a light-tight casing separated to reveal a film cassette.

As shown in FIG. 1, a single-use camera 51 comprises a plastic light-tight film casing 53 and the film cassette 1 located inside the casing.

The light-tight film casing 53 consists of a front section 55 and a rear section 57 which are mating shaped for assembly into one box-shaped light-tight body. The front section 55 is provided with a fixed-focus taking lens 59, a back frame opening 61 surrounding the taking lens, a viewfinder window 63 for viewing a subject to be photographed, a cassette receiving chamber 65 for the film cassette 1 located proximate one end side of the back frame opening, a roll film supporting chamber 67 for an unexposed film roll 69 located proximate another end side of the back frame opening, and a pair of top and bottom parallel film tracks 71 and 73 adjacent top and bottom sides of the back frame opening. Projecting from a top wall of the cassette receiving chamber 65 is a rotational spool driver 75 which is rotated in a clockwise direction as viewed in FIG. 1 in engagement with the spool core 15, by a film advance thumbwheel 77, to rewind successive exposed frames of the filmstrip 13 into the cassette shell 3. A metering sprocket 79 in engagement with the filmstrip 13 at respective film perforations controls a known exposure counter and film metering mechanism, not shown.

The rear section 57 includes a pressure pad 81 for holding the filmstrip 13 over the back frame opening 61 during exposure. A weakened area 83 is preformed in the rear section 57 to cover only an end portion 85 of the active light lock 9. The end portion 85 is engageable by a rotational light lock driver, not shown, as disclosed in cross-referenced application Ser. No. 08/181286 to be rotated from open to closed after the filmstrip 13 is completely rewound into the cassette shell 3 following the last exposure. The weakened area 83, preferably, has a thickness which is less than the surrounding areas of the rear section 57 and has a diameter which is substantially the same as the diameter of the end portion 85. Thus, the weakened area 83 can be entirely pierced by the rotational light lock driver to make a perforation in the rear section 57 which is dimensioned to permit access only to the end portion 85 to allow the light lock driver to engage the end portion for rotating the active light lock 9 from open to closed. Simultaneously, the rear section 57 is destroyed to prevent it from being reused.

THE SINGLE-USE CAMERA—ALTERNATE EMBODIMENT

Figure 6:
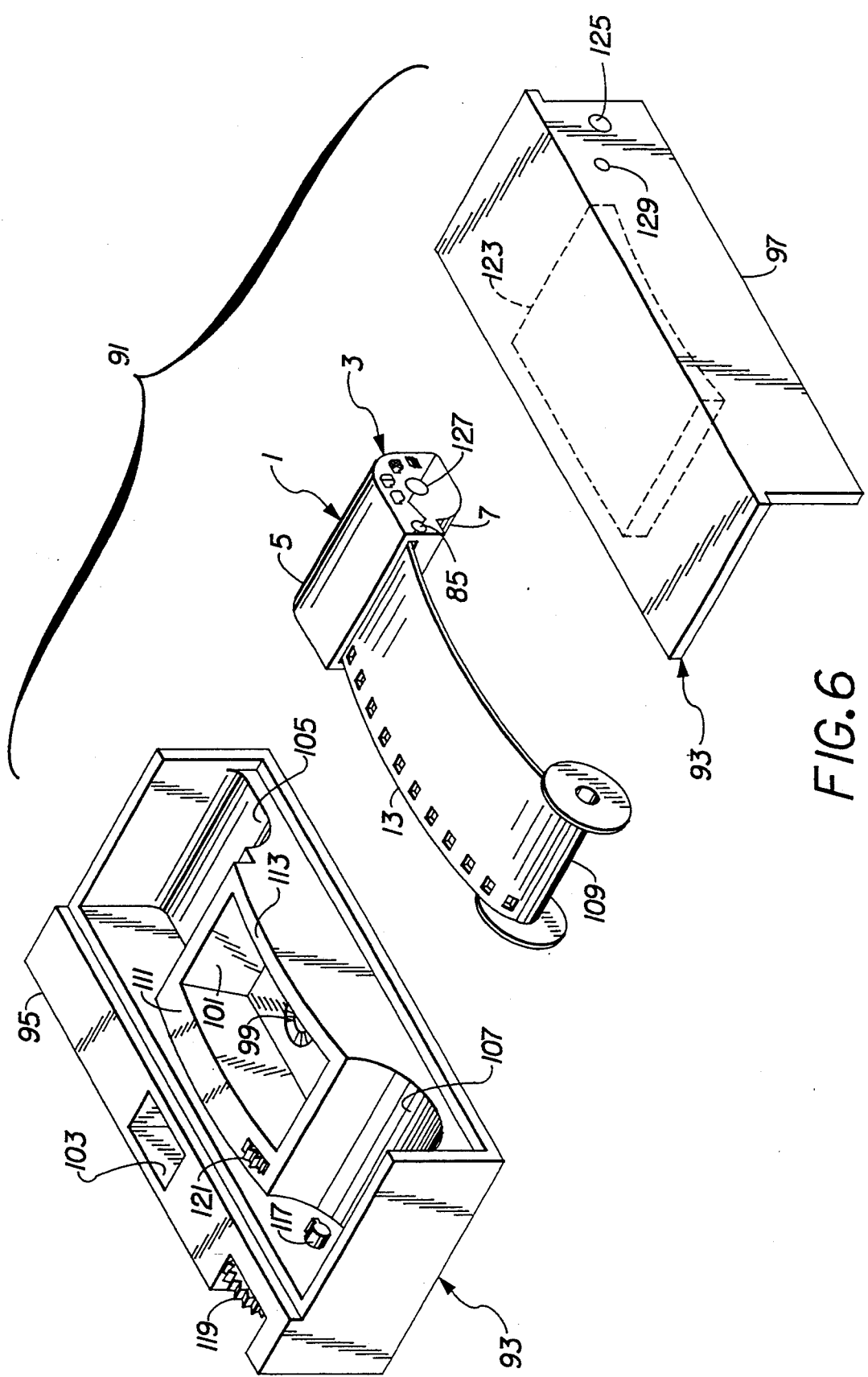
FIG. 6 is a rear exploded perspective view similar to FIG. 1 in accordance with an alternate embodiment of the invention.

As shown in FIG. 6, a single-use camera 91 comprises a plastic light-tight film casing 93 and the film cassette 1 located inside the casing.

The light-tight film casing 93 consists of a front section 95 and a rear section 97 which are mating shaped for assembly into one box-shaped light-tight body. The front section 95 is provided with a fixed-focus taking lens 99, a back frame opening 101 surrounding the taking lens, a viewfinder window 103 for viewing a subject to be photographed, a cassette receiving chamber 105 for the film cassette 1 located proximate one end side of the back frame opening, a spool supporting chamber 107 for an unexposed film spool 109 located proximate another end side of the back frame opening, and a pair of top and bottom parallel film tracks 111 and 113 adjacent top and bottom sides of the back frame opening. Projecting from a top wall of the spool supporting chamber 115 is a rotational spool driver 117 which is rotated in a counter-clockwise direction as viewed in FIG. 6 in engagement with the film spool 109, by a film advance thumbwheel 119, to wind successive exposed frames of the filmstrip 13 onto the film spool. A metering sprocket 121 in engagement with the filmstrip 13 at respective film perforations controls a known exposure counter and film metering mechanism, not shown.

The rear section 97 includes a pressure pad 123 for holding the filmstrip 13 over the back frame opening 101 during exposure. A weakened area 125 is preformed in the rear section 97 to cover only an end portion 127 of the spool core 15. The end portion 127 is engageable by a rotational spool driver, not shown, for rotating the spool core 15 clockwise as viewed in FIG. 6 to wind the filmstrip 13 into the cassette shell 3 after the last exposed frame is wound onto the film spool 109. The weakened area 125, preferably, has a thickness which is less than the surrounding areas of the rear section 97 and has a diameter which is substantially the same as the diameter of the end portion 127. Thus, the weakened area 125 can be entirely pierced by the rotational spool driver to make a perforation in the rear section 97 which is dimensioned to permit access only to the end portion 127 to allow the spool driver to engage the end portion for rotating the spool core 15 to wind the filmstrip 13 into the cassette shell 3. Simultaneously, the rear section 97 is destroyed to prevent it from being reused.

A weakened area 129 is preformed in the rear section 97 to cover only the end portion 85 of the active light lock 9. The weakened area 129 is identical to the weakened area 83 in FIG. 1. See the foregoing description of the weakened area 83.

The invention has been described with reference to a preferred embodiment. However, it will be appreciated that variations and modifications can be effected by persons of ordinary skill in the art without departing from the scope of the invention.

PARTS LIST FOR FIGS. 1-5

1. film cassette
3. cassette shell
5 & 7. shell halves
9. light-shielding door
11. film spool
13. filmstrip
15. spool core
17. spool lock
19. covering label
21. spool teeth
23. interdental spaces
25 & 27. spool disks
29. trailing film end
31. camming means of door
33. detent of spool lock
35, 37, 39, & 41. four icon cut-outs
43. indicator flag
51. single-use camera
53. light-tight film casing
55. front section
57. rear section
59. taking lens
61. back frame opening
63. viewfinder window
65. cassette receiving chamber
67. roll film supporting chamber
69. film roll
71 & 73 film tracks
75. spool driver
77. thumbwheel
79. metering sprocket
81. pressure pad
83. weakened area
85. end portion
91. single-use camera
93. light-tight film casing
95. front section
97. rear section
99. taking lens
101. back frame opening
103. viewfinder window
105. cassette receiving chamber
107. film spool supporting chamber
109. film spool
111 & 113 film tracks
115. spool supporting chamber
117. spool driver
119. thumbwheel
121. metering sprocket
123. pressure pad
125 & 129. weakened areas
127. end portion

What is claimed is:

1. A single-use camera comprising a light-tight film casing and a film cassette located inside said casing, is characterized in that:
   said film cassette has an active light lock with an end portion engageable to rotate said light lock open to permit film movement out of and into the cassette interior and closed to prevent ambient light from entering the cassette interior;
   said casing has a weakened area covering said end portion of the light lock which can be entirely pierced to make a perforation in the casing to permit access to the end portion to engage it for rotating said light lock closed and, simultaneously, to destroy the casing to prevent it from being reused.

2. A single-use camera as recited in claim 1, wherein said weakened area has a thickness which is less than the thickness of surrounding areas of said light-tight casing.

3. A single-use camera as recited in claim 1, wherein said end portion of the light lock and said weakened area have substantially the same diameter.

4. A single-use camera as recited in claim 1, wherein said film cassette has a rotatable film spool with an end portion engageable to rotate said spool and said casing has a weakened area covering said end portion of the spool which can be entirely pierced to make a perforation in the casing to permit access to the end portion to engage it for rotating said spool and, simultaneously, to destroy the casing to prevent it from being reused.

5. A single-use camera as recited in claim 4, wherein said weakened area covering said end portion of the light lock and said weakened area covering said end portion of the spool each have a similar thickness which is less than the thickness of surrounding areas of said casing.

* * * * *